US008827575B1

(12) United States Patent
Caldeira

(10) Patent No.: US 8,827,575 B1
(45) Date of Patent: Sep. 9, 2014

(54) CAMERA STABILIZATION APPARATUS FOR USE IN AQUATIC ENVIRONMENT

(71) Applicant: Brad W Caldeira, Boca Raton, FL (US)

(72) Inventor: Brad W Caldeira, Boca Raton, FL (US)

( * ) Notice: Subject to any disclaimer, the term of this patent is extended or adjusted under 35 U.S.C. 154(b) by 0 days.

(21) Appl. No.: 14/201,831

(22) Filed: Mar. 8, 2014

(51) Int. Cl.
*G03B 17/08* (2006.01)
*G03B 17/56* (2006.01)
*G03B 15/00* (2006.01)

(52) U.S. Cl.
CPC .............. *G03B 17/561* (2013.01); *G03B 15/00* (2013.01)
USPC ............................................ 396/421; 396/29

(58) Field of Classification Search
CPC ....................................................... G03B 17/08
USPC .................................................... 396/29, 421
See application file for complete search history.

(56) References Cited

U.S. PATENT DOCUMENTS

| 5,361,169 | A | * | 11/1994 | Deal | 359/838 |
| 2001/0040623 | A1 | * | 11/2001 | Weber | 348/81 |
| 2007/0242134 | A1 | * | 10/2007 | Zernov | 348/81 |
| 2012/0175459 | A1 | * | 7/2012 | Geswender et al. | 244/3.24 |
| 2013/0051779 | A1 | * | 2/2013 | Londeree et al. | 396/25 |

* cited by examiner

*Primary Examiner* — Clayton E LaBalle
*Assistant Examiner* — Dennis Hancock
(74) *Attorney, Agent, or Firm* — Kajane McManus

(57) ABSTRACT

The apparatus for stabilizing a camera when used in an underwater environment comprises a hand grab having a flat top surface, the flat top surface of the hand grab slidably engaging a pair of elongate parallel rods at a proximal end of the rods, the rods further slidably engaging, at a distal end thereof, a platform resting upon the rods which engages a camera base, and a fin of predetermined configuration, the fin being slidably engaged upon the rods at a position between the proximal and distal ends thereof, the structures being movable along the length of the rods to establish a stabilization of the camera as a user is moving through water, or as water is moving past the camera. Further, at least one distally directed light source is provided suitably engaged to or provided on an undersurface of the fin.

20 Claims, 4 Drawing Sheets

CAMERA STABILIZATION APPARATUS FOR USE IN AQUATIC ENVIRONMENT

BACKGROUND OF THE INVENTION

1. Field of the Invention

According to the invention there is provided an apparatus for use in stabilizing a camera for underwater photography. More specifically, the apparatus is created to eliminate shake during underwater photography by dampening the effects of water flow against the camera, by substantially decreasing the drag coefficient of the water flow thereagainst.

2. Prior Art

Heretofore, it is not believed that any such stabilization apparatus or system has been proposed for use in an aquatic environment.

SUMMARY OF THE INVENTION

According to the invention, there is provided an apparatus for stabilizing a camera when used in an aquatic environment. The apparatus comprises a hand grab having a flat top surface, the flat top surface of the hand grab including connector means for slidably engaging a pair of elongate parallel rods at a proximal end of the rods, the rods further slidably engaging, at a distal end thereof, connector means on an undersurface of a platform resting upon the rods. The platform includes means for engaging a camera base. A structure referred to as a fin of predetermined configuration is also slidably engaged upon the rods by connector means on an undersurface thereof at a position between the proximal and distal ends thereof. All of the slidably engaged structures are movable along the length of the rods to establish a stabilization of the camera as a user is moving through water, or as water is moving past the camera. In one preferred embodiment, light is provided by powered LED type bulbs also mounted to the undersurface of the fin to provide light to the user when enveloped in darkness.

These and other aspects, features and advantages of the present invention will become more readily apparent from the attached drawings and the detailed description of the preferred embodiments, which follow.

DESCRIPTION OF THE PREFERRED EMBODIMENTS

Figure 1:
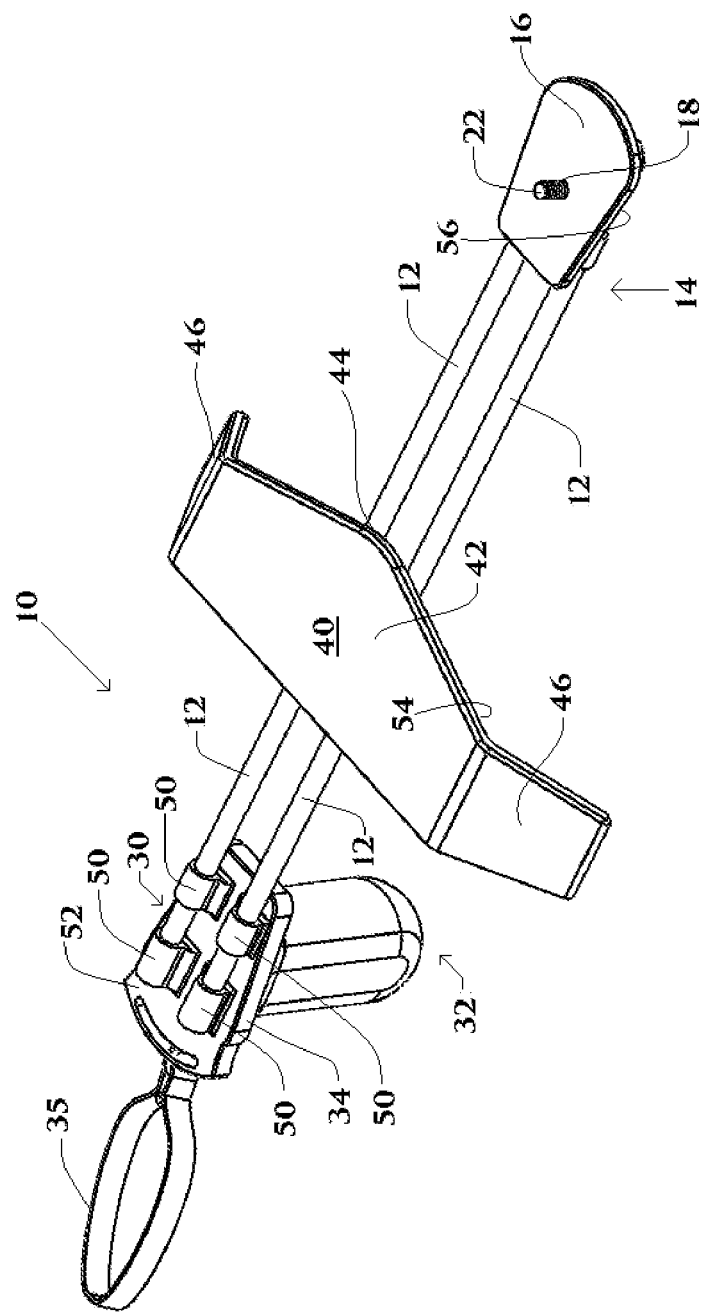
FIG. 1 is a perspective view of the camera stabilization apparatus of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings in greater detail, there is illustrated therein an apparatus for stabilizing a camera for underwater photography, generally identified by the reference numeral 10. The apparatus 10 includes a pair of elongate, parallel rods 12 which lie in the same plane along which other structures of the apparatus 10 are slidable into desired positions relative to one another, as will be defined hereinafter.

Figure 2:
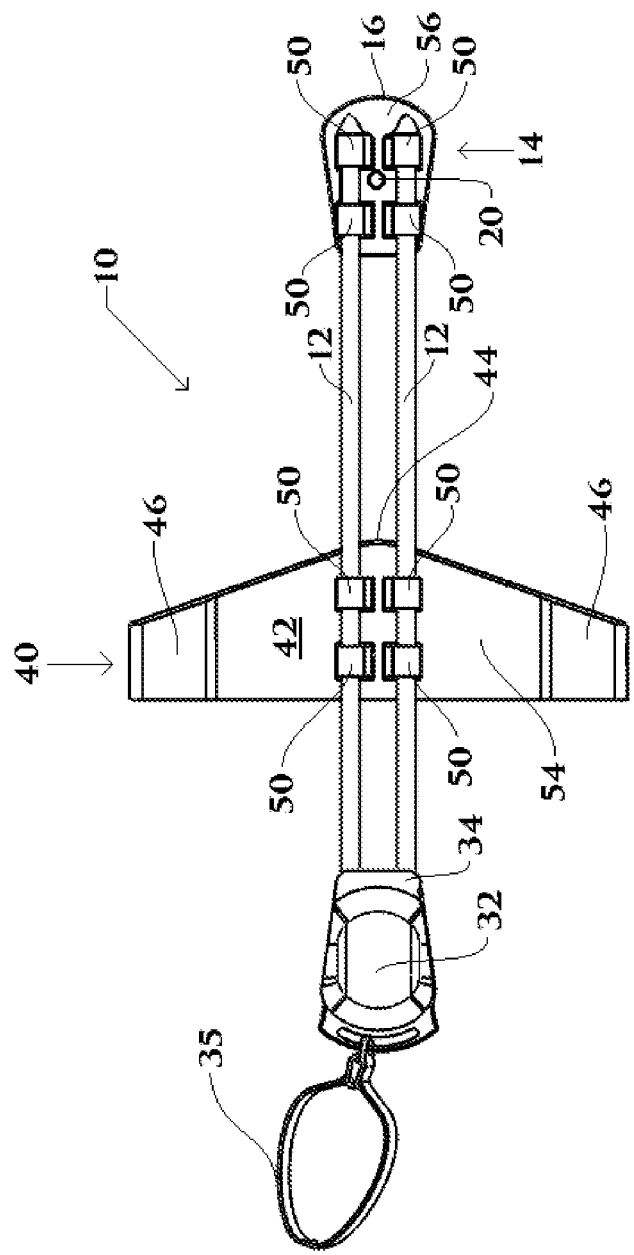
FIG. 2 is a bottom plan view of the apparatus of FIG. 1.

The rods 12 at a distal end 14 thereof slidably engage thereon a platform 16 to which a camera 17 (FIG. 3) is suitably engaged by a connector 18, in a manner similar to that in which a camera may be engaged to a tripod there for. In the illustrated embodiment, a bore 20 (FIG. 2) upwardly receives there through a bolt 22, to which any camera 17 with a corresponding bolt receiving slot (not shown) may be engaged in known manner. This example, however, should not be construed as limiting inasmuch as other connectors 18 such as hook and loop members (not shown), may also be used with embodiments of cameras without a bolt receiving slot, for illustration. The platform 16 lies in a plane above the rods 12, also in parallel relationship relative thereto.

Further, at a proximal end 30 of the rods 12 there is provided a hand grab or handle 32 which extends downwardly from and below the rods 12, which handle 32 a user grasps to hold the apparatus 10 in position for taking a picture with the camera 17 mounted on the distal end 14 of the rods 12. The handle 32 includes a planar top base 34 by means of which the handle 32 engages beneath the rods 12, also as will be defined hereinafter. Also provided on the proximal end 30 is a strap 35 which is used to secure the apparatus 10 about the wrist (not shown) of the user. It will be understood that the handle 32 is also slidably engaged to the rods 12, as also will be explained in greater detail hereinafter.

Figure 3:
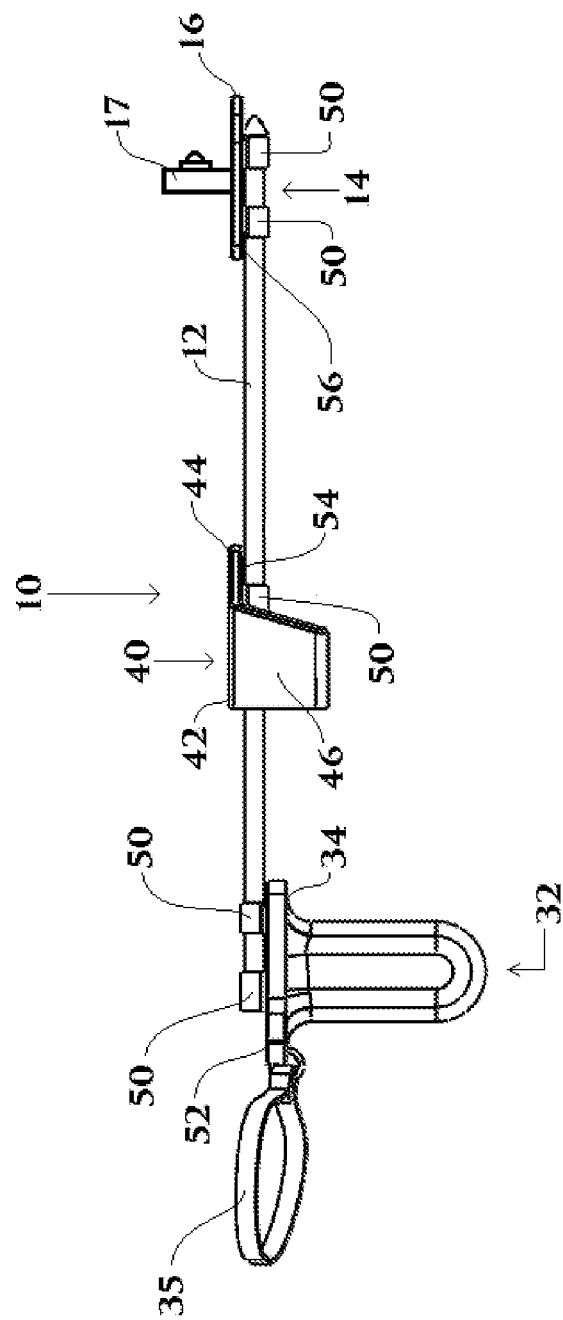
FIG. 3 is a side view of the apparatus of FIG. 1.

Between the camera platform 16 and the handle 32 another structure 40, which will be referred to as a stabilizing fin 40, is slidably engaged to the rods 12. The fin 40 will be seen to lie in the plane of the platform 16 (FIG. 3). It comprises a body 42 which is substantially planar and has a V-shaped, pointed forward tip section 44. The stabilizing fin 40 further includes lateral end flanges 46 which are angularly downwardly disposed from the planar body 42 and form side end portions 46 of the body 42. This stabilizing fin 40, in its particular configuration, provides stabilization for the camera platform 16 as the user moves through water, or alternatively, as water flows across the platform 16 and the apparatus 10. In a preferred embodiment, the fin 40 is made of foam or floating material for giving buoyancy to the apparatus 10.

Through empirical testing it has been found that the fin 40 provides the most desirable stabilization for the camera 17 when the lateral end flanges 46 are preferably positioned at between 120 and 140 degrees relative to the body 42 of the fin 40, and most particularly at 130 degrees, although this should not be construed as limiting.

Turning now to the various slidable yet frictionally positionable rod engaging members 50, it will be seen that they comprise rings 50 which are made of a material which is slidably along the length of the rods 12 but which are also frictionally sufficient to hold the various structures on the rods 12 once positioned as desired. The material which provides such specifications, as an example, could be rubber, which can frictionally engage about the rods 12 but can be moved there along under pressure applied against the structures to which they are fixedly engaged, i.e., a top surface 52 of the planar top base 34 of the handle 32, a bottom surface 54 of the body 42 of the stabilizing fin 40, and a bottom surface 56 of the platform 16 upon which the camera 17 engages. The rings 50 are provided in aligned pairs on each of the structures 32, 40 and 16 in a manner such that the structures 32, 40 and 16 are all aligned along a longitudinal centerline of the apparatus 10. In essence, in the preferred embodiment, the rings 50 could be construed to be thick o-ring like rings 50, or could even be provided in the form of straps or strips of material (not shown), so long as the frictional engagement and slidability under force requirements are met.

With respect to the relative positioning of the structures 32, 40 and 16, their relative positioning depends on the type of photo to be taken with the camera 17. In this respect, when the photo is to be a distance shot, the structures 32, 40 and 16 are expanded in approximately spaced manner along the rods 12 while a close up shot is best stabilized when the structures are brought close together, toward the proximal end 30 of the rods 12, as has been determined through empirical testing of the apparatus 10.

The testing of the apparatus 10 has incorporated use of logic and applied scientific principles, as explained here. In this respect, the underwater camera stabilization apparatus 10, for example, when fully extended allows for maintaining the camera steady underwater.

As an example, if one took a massive object, for example, such a submarine, and secured a camera thereto, the camera would be at the mercy of the submarine while moving underwater. If the submarine was in a steady state, the camera would be in a steady state. If, however, the submarine were shaking, the camera would be shaking. This effect would be due to two things: shape and size, which in science compares to mass of the object as well as its shape.

In contrast, when a camera is attached to a smaller object, for example a human, because of the smaller size and leaner shape, the camera would be more prone to moving freely, and not be as stable, compared to mounting thereof onto the submarine. With the underwater camera stabilization apparatus 10 although the mass of the submarine cannot be reproduced, the shape can essentially be reproduced. This can be accomplished by application of drag coefficients of fluid dynamics and aerodynamics.

The underwater camera stabilization apparatus 10 may be evaluated and better understood through application of the following two equations:

$$C_d = \frac{2F_d}{\rho v^2 A} \text{ Or } F_d = \frac{1}{2}\rho v^2 C_d A$$

where $F_d$ is the drag force, which is by definition the force component in the direction of the flow velocity or the force felt by the user.

p is the mass density of the fluid, in this case water.

v is the speed of the object relative to the fluid. How fast a person is swimming.

A is the reference area.

$C_d$ Drag coefficient

The drag coefficient is not a constant and will vary, slightly increasing and decreasing depending on how fast a user is swimming (v) and the orientation the at which the camera stabilization apparatus 10 is maintained by changing the cross sectional Area (A) of the apparatus 10.

Now $C_d$ and $F_d$ are proportional to one another, meaning when one increases, both variables will increase and for decreasing, both will decrease as well, which shows that when the drag coefficient is small, meaning the object is aerodynamic, the resulting force thereagainst is small and that when the drag coefficient is large, the resulting force is large. These factors are paramount to the aquatic camera stabilization apparatus because, when flowing through water, the apparatus by will inherently choose to take the path of least resistance, and in doing so will stabilize the camera 17 mounted thereon.

Figure 4:
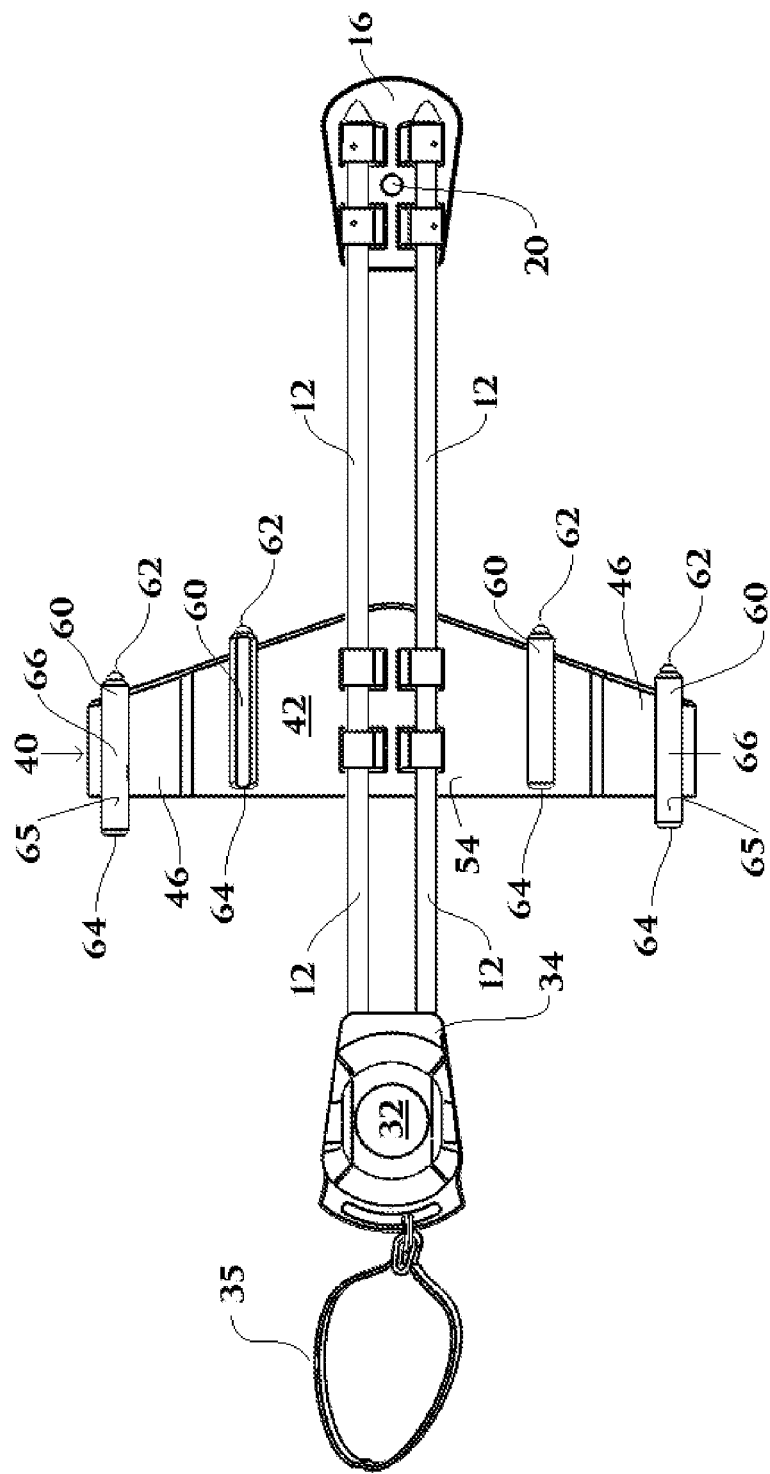
FIG. 4 is a perspective bottom view of another embodiment of the apparatus of the present invention which incorporates powered LED type lights thereon.

Turning now to FIG. 4, there is disclosed therein a substantially identical embodiment of the apparatus 10 described above. In the bottom plan view presented, the apparatus 10 is shown only further incorporating at least one, and preferably a plurality of, distally directed light sources 60 suitably mounted on the underside 54 of the fin 40. The light sources 60 are similar to small flashlights 60 and each light source 60 includes an LED 62 which is battery powered, with each light source 60 further including a suitable on/off switch 64, such as a pushbutton switch 64 at a proximal end 65 of the body 66 of each light source 60, also similar to those found in flashlights. It will be understood that there are several ways of mechanically mounting such light sources 60 to the underside 54 of the fin 40, such as though removable attachment by hook and loop cooperating structures (not shown) or through the provision of the body 66 as unitary with the fin 40, although these examples should not be construed as limiting. This feature of the apparatus 10 becomes useful when one is, for example, deep diving to a distance where sunlight is no longer visible, as well as for use in investigating under rock formations and the like where shadows decrease visibility.

As described above, the apparatus 10 of the present invention provides a number of advantages, some of which have been described above and others of which are inherent in the invention. Also, modifications may be proposed to the apparatus 10 without departing from the teachings herein. Accordingly, the scope of the invention is only to be limited as necessitated by the accompanying claims.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

I claim:

1. An apparatus for stabilizing a camera when used in an aquatic environment, the apparatus comprising a hand grab having a flat top surface, the flat top surface of the hand grab including connector means for slidably engaging a pair of elongate parallel rods at a proximal end of the rods, the rods further slidably engaging, at a distal end thereof, similar connector means on an undersurface of a platform resting upon the rods, the platform includes means for engaging a camera base, a fin of predetermined configuration also being slidably engaged upon the rods by similar connector means on an undersurface thereof at a position between the proximal and distal ends of the rods; all of the slidably engaged structures being movable along the length of the rods to establish a stabilization of the camera as a user is moving through water, or as water is moving past the camera.

2. The apparatus of claim 1 wherein said fin is configured to have a planar body portion made of floating material with side end flanges which are angled relative to the planar body.

3. The apparatus of claim 2 wherein the angulation of the side end flanges to the planar body is between 120 and 140 degrees.

4. The apparatus of claim 2 wherein the angulation of the side end flanges to the planar body is preferably at 130 degrees.

5. The apparatus of claim 1 wherein said platform is engaged to a base of the camera by a bolt which extends upwardly through a bore in the platform and into a bolt receiving hollow in the base of the camera.

6. The apparatus of claim 1 wherein said platform is engaged to a base of the camera by hook and loop connectors.

7. The apparatus of claim 1 wherein a body of the fin has a pointed distal end and a straight proximal end.

8. The apparatus of claim 1 wherein the top surface of the hand grab is frictionally engaged to the rods through frictional connector means extending upwardly from the top surface.

9. The apparatus of claim 1 wherein a bottom surface of the platform is frictionally engaged to the rods through frictional connector means extending downwardly from a bottom surface of the platform.

10. The apparatus of claim 1 wherein a bottom surface of the fin is frictionally engaged to the rods through frictional connector means extending downwardly from a bottom surface of the fin.

11. The apparatus of claim 1 wherein the frictional connector means comprise rings of frictional yet slidable material.

12. The apparatus of claim 11 wherein the material of the frictional yet slidable connector means is rubber.

13. The apparatus of claim 1 further including at least one distally directed light source suitably engaged to or provided on an undersurface of the fin.

14. The apparatus of claim 13 wherein a plurality of distally directed light sources are provided.

15. The apparatus of claim 13 wherein the at least one distally directed light source is positioned along a distal end of said fin.

16. The apparatus of claim 14 wherein each of the plurality of light sources is mounted at a downwardly extending end edge of each side end flange.

17. The apparatus of claim 14 wherein each of the plurality of light sources is mounted at a position where the planar fin and side edge flange abut.

18. An apparatus for stabilizing a camera when used in an underwater environment, the apparatus comprising at least a hand grab having a flat top surface, the flat top surface of the hand grab slidably engaging a pair of identical elongate parallel rods at a proximal end of the rods, the rods further slidably engaging, at a distal end thereof, a platform resting upon the rods which suitably engages a camera base, and a fin of predetermined configuration, the fin being slidably engaged upon the rods at a position between the proximal and distal ends thereof, the structures being movable along the length of the rods and the rods being movable relative to the hand grab to establish a stabilization of the camera as a user is moving through water, or as water is moving past the camera wherein the configuration of the apparatus will be best understood through application of the following two equations:

$$C_d = \frac{2F_d}{\rho v^2 A} \text{ Or } F_d = \frac{1}{2}\rho v^2 C_d A$$

wherein:
$F_d$ is the drag force, which is by definition the force component in the direction of the flow velocity or the force felt by the user,
P is the mass density of the fluid, in this case water,
v is the speed of the object relative to the fluid. How fast a person is swimming,
A is the reference area,
$C_d$ is drag coefficient;
the drag coefficient varying, slightly increasing or decreasing depending on how fast a user is swimming (v) and the orientation at which the camera stabilization apparatus 10 is maintained by changing the cross sectional Area (A) of the apparatus 10, with $C_d$ and $F_d$ being proportional to one another, meaning that when one increases, both variables increase and for decreasing, both will decrease as well, showing that when the drag coefficient is small, meaning the object is aerodynamic, the resulting force there against is small and that when the drag coefficient is large, the resulting force there against is large as well.

19. The apparatus of claim 18 wherein the frictional yet slidable engagements are provided by a plurality of rubber rings suitably engaged to appropriate surfaces of the structures of the apparatus.

20. The apparatus of claim 18 wherein a plurality of distally directed light sources are provided along an undersurface of the fin.

* * * * *